Aug. 18, 1931.                E. SCHÜRER                1,819,128

COIL JUNCTION BOX FOR SUBMARINE CABLES

Filed May 28, 1928

E. Schürer
INVENTOR

By: Marks & Clerk
Attys

Patented Aug. 18, 1931

1,819,128

UNITED STATES PATENT OFFICE

EUGEN SCHÜRER, OF COLOGNE-MULHEIM, GERMANY, ASSIGNOR TO FELTEN & GUILLE-AUME CARLSWERK AKTIENGESELLSCHAFT, OF COLOGNE-MULHEIM, GERMANY

COIL-JUNCTION-BOX FOR SUBMARINE CABLES

Application filed May 28, 1928, Serial No. 281,229, and in Germany May 28, 1927.

This invention relates to junction-boxes for submarine telegraph cables, and more particularly to junction-boxes, in which the self inductance coils of a pupinized cable are accommodated. The object of the invention is to provide the said coils with coverings capable of protecting them against the water pressure, and to make the junction-box, in which the coils are arranged in series, so flexible, that it will not be damaged when the cable passes over the stern drum of the cable-laying vessel.

It is already known in the manufacture of such boxes, to surround the loading coils by short cylindrical tubes of pressure resisting material, for instance steel, and to insert discs of soft or elastic material, for instance, india-rubber, between them. Further it is known, to surround the coils lying behind one another with india-rubber which is pressed thereon so as to produce an elongated cylindrical body which is vulcanized.

The present invention is an improvement in the coil box or sleeve last referred to. It has been found that when the rubber is pressed onto the coils, the cores of the coils are easily damaged, since the said cores are made of powdered material and are therefore very sensitive to mechanical influences. Further, the temperature required for the vulcanization of the rubber effects great variations in the magnetic properties of the coil. For this reason, according to the invention, each individual coil is enclosed in a cup of vulcanized rubber. These cups comprise two halves, having edges which allow them to be inserted within one another. For strengthening purposes helical wires may be vulcanized within the walls of the cups. In addition to the drawbacks above referred to being avoided, the said india-rubber cups have the advantage that they lend themselves to mass production, whereby the cost of manufacture is reduced.

In order to strengthen the rubber cups with respect to radial pressures, a circular disc of metal is provided between each two coils enclosed in the cups. Grooves are formed on the periphery of the intermediate discs in an inclined direction with respect to the axis of the disc for the purpose of accommodating the leads to the coils which run helically around the box. The rubber cups themselves are not provided with guiding grooves.

Figure 1:
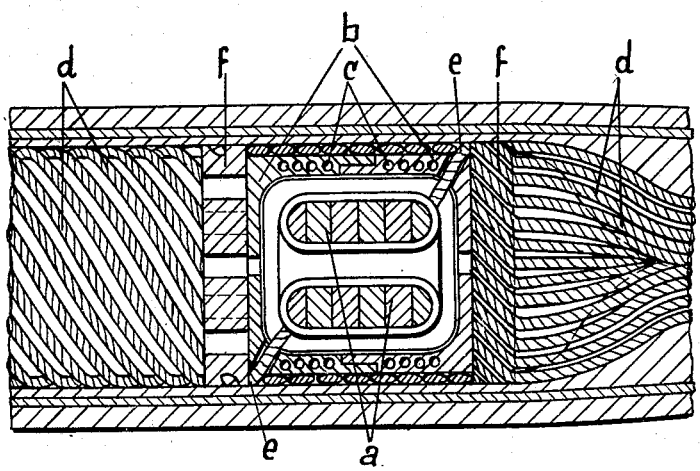
Figure 2A:
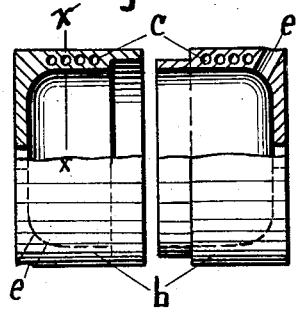
Figure 2B:
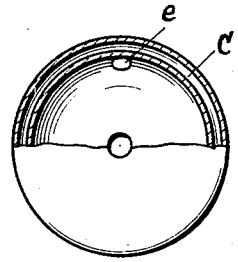
Figure 3A:
Figure 3B:
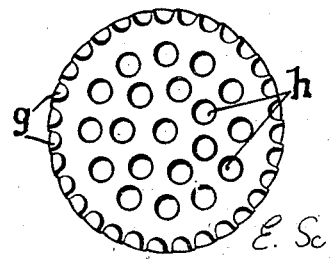

The invention is illustrated, by way of example, in the accompanying drawings, in which Figure 1 shows in sectional elevation a portion of the box or sleeve. *a* is the coil, *b* are the india-rubber cups, *c* the reinforcing wires vulcanized therein, *d* the cable conductors and the helically wound leads to the coils, *e* holes in the cups for the introduction of the ends of the leads, and *f* the intermediate discs reinforcing the box. The cups are shown separately in Figure 2A partly in section. Figure 2B illustrates an end view of a cup partly in section along the line *x—x* in Figure 2A. Figure 3A shows an elevation of the intermediate disc with the grooves *g*, whilst Figure 3B is an end view of the said disc, *h* being holes provided in the disc in order to reduce its weight.

What I claim is:—

A coil-junction box for submarine cables comprising for each coil two cylindrical cups of vulcanized rubber with smooth outer surface and capable of being inserted into one another to enclose the coil, the said cups having reinforcing wires vulcanized therein, in combination with perforated metal discs between each pair of cups, said metal discs having helical grooves on their periphery for the accommodation of the coil leads.

In testimony whereof I have signed my name to this specification.

EUGEN SCHÜRER.